UNITED STATES PATENT OFFICE.

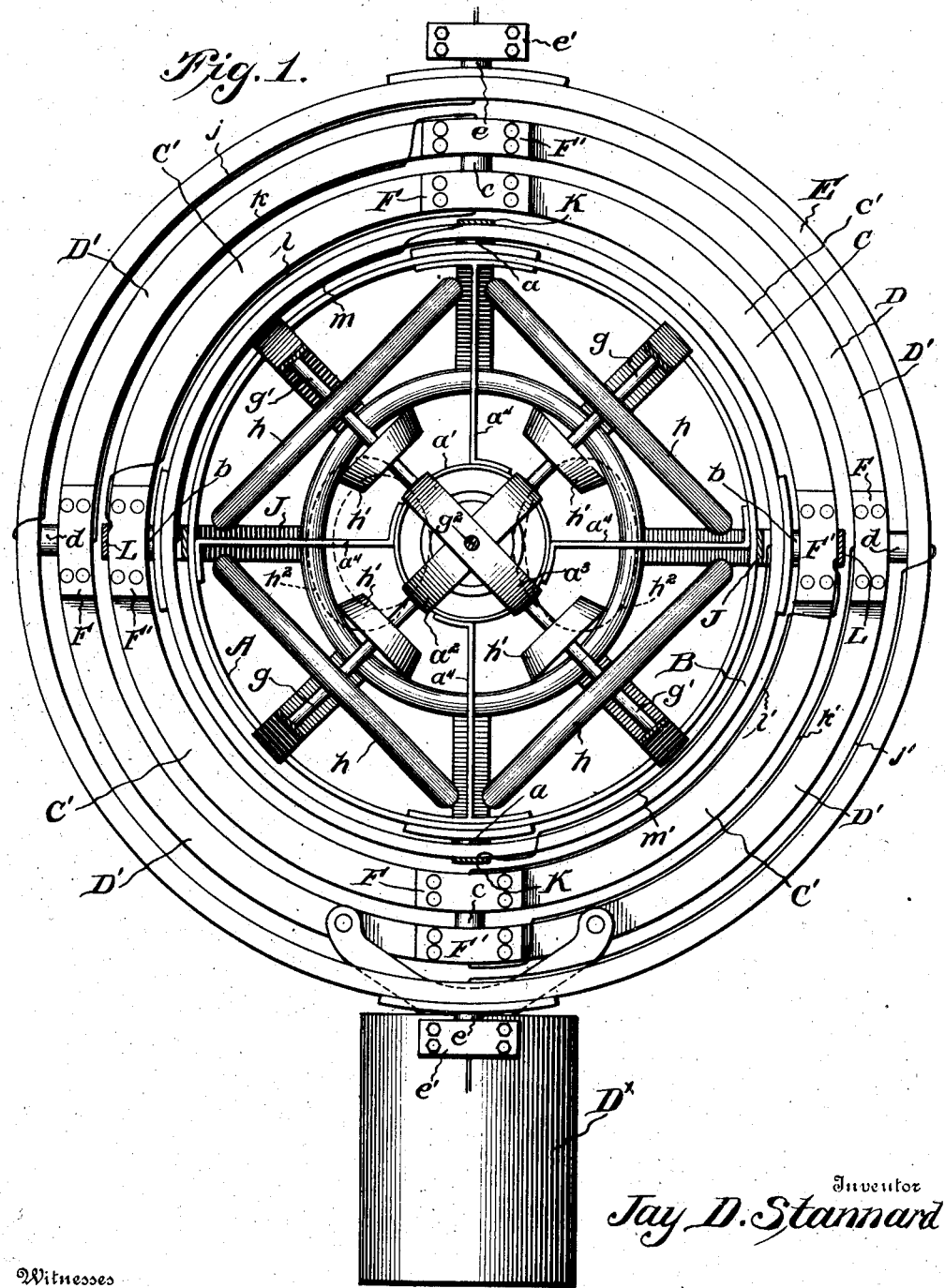

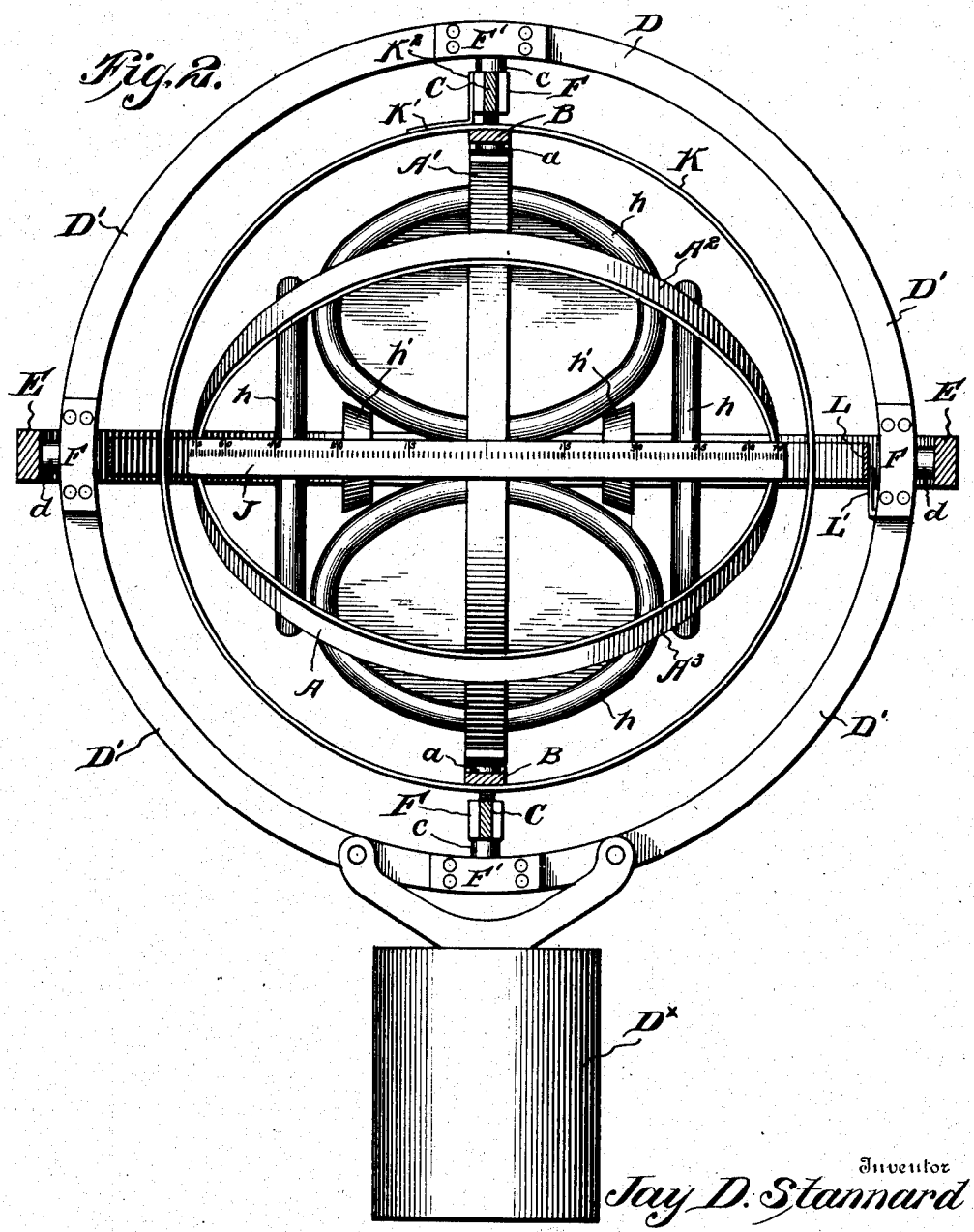

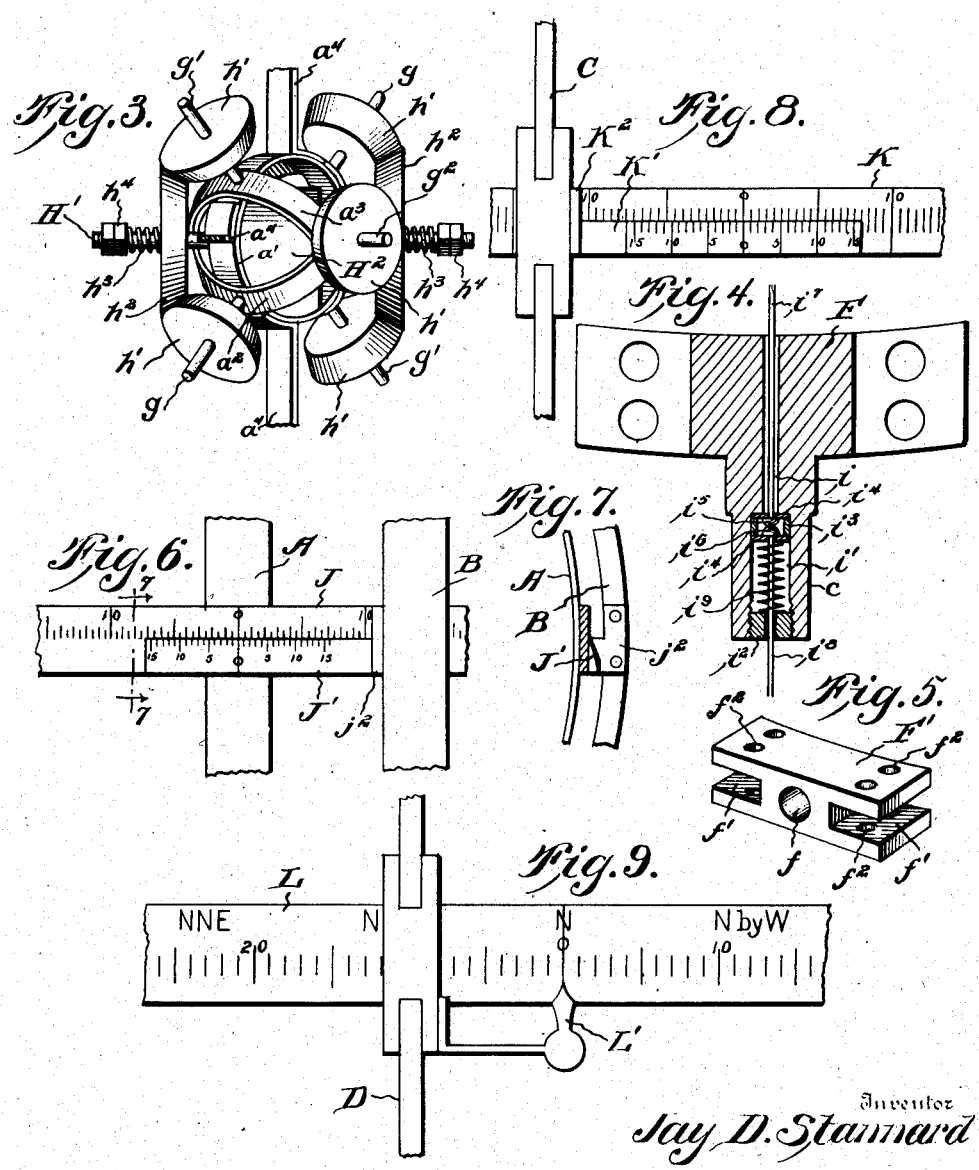

JAY D. STANNARD, OF PHŒNIX, ARIZONA TERRITORY.

NAUTICAL INDICATING DEVICE.

No. 865,278.          Specification of Letters Patent.          Patented Sept. 3, 1907.

Application filed February 25, 1907. Serial No. 359,191.

*To all whom it may concern:*

Be it known that I, JAY D. STANNARD, a citizen of the United States of America, residing at Phœnix, in the county of Maricopa and Territory of Arizona, have invented new and useful Improvements in Nautical Indicating Devices, of which the following is a specification.

This invention relates to a nautical indicating device by which the position of a vessel at any time in its course or location on the earth's surface may be determined with approximate accuracy without the necessity of making the usual observations and calculations, the object of the invention being to provide a device of this character which will read sufficiently accurate for all practical purposes and will be of value at times when observations cannot be made.

A nautical indicating device constructed in accordance with my invention in its preferred embodiment is illustrated in the accompanying drawings, in which:—
Figure 1 is a sectional plan view showing the rings of the instrument disposed in a common plane to better illustrate certain features, including the electrical connections to the gyroscope motor. Fig. 2 is a view in elevation with parts in vertical section, the plane of section being at right angles to the supporting trunnions of the instrument. Fig. 3 is a view of the drive gearing of the gyroscopes. Fig. 4 is a sectional view of one of the trunnion brackets. Fig. 5 is a detail view of one of the combined coupling and bearing brackets.
Fig. 6 is an elevation of the means for indicating the longitude. Fig. 7 is a section on line 7—7 of Fig. 6. Fig. 8 is an elevation of the means for indicating the latitude. Fig. 9 is a view of the means for indicating the bearing of the ship.

Referring to the drawings, A designates an inner frame constituting in the operation of the device a relatively stationary indicating member, said frame preferably comprising a series of three rings $A'$, $A^2$ and $A^3$, arranged in planes mutually perpendicular to each other and connected in any suitable manner. As shown, the ring $A'$ is provided at diametrically opposite points with trunnions $a$, $a$, by which the frame is mounted for rotation in an inner ring B. The ring B is in turn provided with trunnions $b$, $b$ at right angles to axis $a$, $a$ mounted to rotate on an inner vertical ring C, whereby said ring B is adapted to swing on a horizontal axis. The inner vertical ring C turns on vertical trunnions $c$, $c$ on an outer vertical ring D, from the base of which is suspended a weight $D'$, acting to normally maintain it in a vertical position by the action of gravity irrespective of the motions of the vessel on which the device is used. The outer vertical ring is journaled on horizontal trunnion bearings $d$, $d$ carried by an outer or main horizontal ring E which forms a support for the elements thus far described. The ring E is provided at right angles to the bearings $d$, $d$ with trunnions $e$, $e$ adapted to rest in suitable bearings $e'$, $e'$ in a suitable casing or support upon the ship.

The several rings may be of solid or sectional construction, but it is preferred to construct the rings C and D in four sections or quadrants $C'$ and $D'$, respectively, coupled at their ends by pairs of brackets F, $F'$ of the construction shown in detail in Figs. 4 and 5. The brackets F carry the trunnions of their respective rings, while the brackets $F'$ have bearing openings $f$, and form bearings for the coöperating trunnions, it being understood that the trunnions $b$, $b$ of ring B are journaled in the bearing brackets $F'$ of ring C, while the trunnions $c$, $c$ carried by the brackets F of ring C are journaled in the bearings $F'$ of ring D, and that the trunnions $d$, $d$ of the bearing brackets F of the latter are journaled in suitable bearing openings in the outer main ring E. The brackets F, $F'$ are provided with end receiving slots $f'$ for the reception of the ends of the adjacent ring sections or quadrants, which are secured thereto by rivets or other suitable fastenings passing through opening $f^2$ in the walls of the slots. The trunnions of the several rings are hollow for the passage of electrical conductors of a gyroscopic driving mechanism, as hereinafter described.

The frame A constitutes, as stated, one of the indicating members of the instrument, and is freely adjustable on its trunnions $a$, $a$ so that the latter may be placed parallel to the axis of the earth, the said frame being maintained in such position during the operation of the instrument on the traveling vessel, so that through the means of indicating devices on said frame and on the relatively movable members B, C and D, which are affected by the action of gravity, the position of the vessel on the earth's surface may be determined with a high degree of accuracy. The means for maintaining the frame A with its axis parallel to the axis of the earth comprises a gyroscopic mechanism supported by the same in conjunction with an inner supporting frame similar in construction to said frame A. As shown in detail in Fig. 3, the inner supporting frame is formed of rings $a'$, $a^2$, $a^3$ arranged in planes mutually perpendicular to each other and each in the plane of the corresponding ring of the frame A, said inner supporting frame being rigidly tied and connected with the frame A by spokes or braces $a^4$. Journaled in said inner supporting frame is a series of six shafts $g$, $g'$, $g^2$, etc., each carrying a wheel or gyroscope $h$ and a beveled friction wheel or disk $h'$, the said friction disks of the shafts being arranged for driving contact with friction drive disks $h^2$ mounted on the armature shaft $H'$ of an electric motor $H^2$ of suitable construction arranged within the inner supporting frame. The wheels $h^2$ are feathered for rotation with and sliding motion on the armature shaft and are normally pressed in contact with the disks h' by pressure springs h³ adjustable to regulate their pressure by means of nuts h⁴ threaded on the armature shaft, which latter is journaled for rotation in the supporting frame in any preferred manner. The rings of the supporting frame form supports for the field magnets of the motor, and the springs h³ are provided not only to secure the proper amount of pressure of the drive disks on the disks of the gyroscope shaft, but also to slightly shift the armature shaft to adjust the center of gravity of the instrument to the center of the trunnion a, a and b, b.

It is well known that the tendency of a rapidly revolving wheel or sphere is to maintain itself in the plane of its rotation. If no other forces are acting upon it, it will retain its position as long as the rotation is continued. The effects of the wheels or gyroscopes h revolving in planes at right angles to each other is to maintain the frame A in the position in which it is set. Hence if the axis a, a of the frame is placed parallel to the earth's axis and motion communicated to the wheels or gyroscope, the said axis a, a would be maintained parallel to the earth's axis so long as the motion of the gyroscopes is maintained, irrespective of the motion of the vessel on which the indicating device is carried.

The electrical connections for driving the motor H² may be of any preferred construction and arrangement, and primary batteries may be the source of electrical energy. The electrical feed and return wires extend through the trunnions of the rings to and from the motor, the trunnions being hollow or tubular for this purpose, as shown in detail in Fig. 4. It will be observed by reference to this view that a bore or passage i is provided which extends through the bracket F and part way into the trunnion c, and communicates with an enlarged passage or chamber i' formed in the outer end of the latter, which chamber is closed at its outer end by a perforated threaded plug or nut i². At the inner end of the chamber is a tube i³ of non-conducting material, closed by disks or heads i⁴ of similar material, thus forming a junction box or chamber. In said junction box or chamber are heads or contact pieces i⁵, i⁵ of some good electrical conducting material, such as platinum, said contact pieces being respectively arranged upon the inner ends of metallic conductors i⁷, i⁸, extending through the bore i and chamber i'. A coiled spring i⁹ is provided between the plug i² and disk i⁴ to hold the junction box against a shoulder formed at the junction of the bore and chamber, the pressure of which spring may be regulated by adjusting the plug. The tube i³ is a little shorter than the combined length of the contact pieces to allow the same to be brought together by the action of the spring. The conducting wires from the poles of the batteries connect with the conductors i⁸ of the respective trunnions e, and the sets of connecting wires from the conductors i⁷ from the trunnion e at one side to the motor and from the motor to the opposite trunnion e extend along the rings at opposite sides of the instrument and are suitably supported thereby and insulated therefrom, the letters j, k, l and m denoting the conducting wires at one side and j', k', l' and m' the conducting wires at the opposite side.

The indicating devices employed in conjunction with the circles or rings B, C and D are shown in detail in Figs. 6 to 9, inclusive. These devices coöperate with an indicating device on the frame A, which comprises a graduated circle J fixed to said frame at an angle of 90 degrees from the trunnions a, a, said circle being graduated to degrees and half degrees from 0 to 180 to 0 and designed to be read to half minutes by a vernier J' secured by a bracket J² to the ring B, as clearly shown in Figs. 6 and 7. This graduated circle answers to the equator of the earth, its purpose being to indicate the longitude. A graduated circle K is attached to the outside of the ring B 90 degrees from the trunnions b, b. This circle is graduated to degrees from 0 to 90 to 0 to 90 to 0, and is designed to be read to single minutes by means of a vernier K' secured by a bracket K² to the ring C opposite the weight D' fixed to the ring D, said circle being so placed that the vernier will read 90 degrees when the ring B lies in the plane of the ring C. A third graduated circle L is attached to the outside of the ring C 90 degrees from the trunnions c, c. There are two systems of graduation on this circle, as shown in Fig. 9, the upper one embodying the principal points of the mariner's compass and the lower one being graduated to degrees. A pointer or indicator L' is attached to the ring D to coöperate with the scale or circle L, the graduations on which range from 0 to 90 to 0 to 90 to 0, and is so placed as to indicate 90° when the ring C and D are in the same plane. The graduated circle K answers to a meridian circle and indicates the latitude, while the circle L will indicate the bearing of the ship.

In the practical use of the device, the axis d, d of the outer vertical circle B is fixed parallel to the center line of the ship, in alinement with the trunnions d, d which extend toward the bow and stern of the ship, the angle between it and the vertical plane of the axis a, a, which is always in the meridian, being consequently the bearing of the course upon which the ship is sailing which may be conveniently read at all times on the scale L through the medium of the pointer L'. Since the frame A is freely adjustable to set its axis parallel with the earth's axis and the circles are also adjustable at angles to indicate in connection with the indicating devices thereon the latitude and longtiude of the point of location of the vessel on the earth's surface, it will be apparent that upon setting the axis of the frame A parallel to the earth's axis and setting the gyroscopes into action to maintain said frame in such position during the course of travel of the vessel, the relative movements of the rings produced by the action of gravitation and by the change of position of the vessel on the earth's surface will cause the indicating devices to be correspondingly affected to denote the latitude and longitude as well as the bearing of the ship.

As an example, in the use of the instrument the latitude of the place from which the vessel starts will be set off on the circle K and the longitude of the place set off on the circle J, so that upon setting the proper bearing on the circle L the axis a, a will be revolved into the plane of the meridian and will be parallel to the earth's axis. Upon starting the motor the gyroscopes will maintain the frame A in position so that its axis will always be parallel to the axis of the earth. Accordingly, as the ship moves from its original position the component of the ship's motion in latitude may be read on the circle K and its component in longitude may be determined from the circle J, while the bearing of the ship will be shown on circle L.

As explanatory of the way of setting and mode of operation of the device, suppose a vessel were at the equator in longitude 50° W., the plane H would be turned about the axis *a a* until the angle 50° W. would be indicated on the circle J. The latitude being 0°, the circle K would be brought to that reading by revolving about the axis *b b*. This reading would bring the axis *a a* horizontal. If the ship be headed north the circle L on the ring C would be rotated about the axis *c c* until the reading would be 0°. This would bring the axis *a a* into the plane of the meridian. The axis *a a* would then be parallel to the earth's axis. Let the gyroscopes be now started, and the axis of the indicator will be held parallel to the axis of the earth as long as the motion of the gyroscopes is maintained. Because of the fact just stated the component of ship's movement in latitude will be shown on circle K and the component in longitude will be shown on circle J. If it is found necessary to make a correction in longitude, due to the earth's rotation on its axis, the time by chronometer will give the necessary factor for making the correction.

A general rule for setting the indicator would be to rotate the circle J to the angle representing the longitude of the vessel's location, rotate the circle K to the latitude and set off the bearing of the ship on the circle L. The indicator will then be "set".

The accuracy of the indicator may be tested from time to time during a voyage by reading the circles at the instant of the observation. The proper corrections may then be applied.

The device is not intended to entirely supersede the compass or obviate the necessity of making the usual observations and calculations that are now necessary to determine the location of the vessel, although the device will enable such location to be determined with a fair degree of accuracy at any time.

The device is of value particularly in cloudy and stormy weather to enable the master to determine the position of the ship when observations cannot be made.

Having thus described the invention, what is claimed as new, is:—

1. A nautical indicating device comprising a member adjustable to set its axis parallel with the earth's axis, means for maintaining said member in such position in the course of travel of the vessel, and a plurality of coacting pairs of relatively movable angle indicators coöperating with said member and influenced by the travel of the vessel, whereby the position of the latter on the surface of the earth may be determined.

2. A nautical indicating device comprising a member adjustable to set its axis parallel with the earth's axis, rotating means within said member for maintaining the same in such position in the course of travel of the vessel, and a plurality of coacting pairs of relatively movable angle indicators coöperating with said member and influenced by the travel of the vessel, whereby the position of the latter on the surface of the earth may be determined.

3. A nautical indicating device comprising a member adjustable to set its axis parallel with the earth's axis, rotating means for maintaining said member in such position in the course of travel of the vessel, electrical driving means for said rotating means, and a plurality of coacting pairs of relatively movable angle indicators coöperating with said member and influenced by the travel of the vessel, whereby the position of the latter on the surface of the earth may be determined.

4. A nautical indicating device comprising a member, adjustable to set its axis parallel with the earth's axis, a gyroscope supported within said member for maintaining the same in such position in the course of travel of the vessel, friction gearing for driving the gyroscope, an electric motor for driving the friction gearing, means for operating the gyroscope, and means coöperating with said member and influenced by the travel of the vessel, whereby the position of the latter on the surface of the earth may be determined.

5. A nautical indicating device comprising a member adjustable to set its axis parallel with the earth's axis, a gyroscope comprising a plurality of pairs of elements arranged to rotate in planes perpendicular to each other and adapted to maintain said member in such position in the course of travel of the vessel, means for operating the gyroscope, and means coöperating with said member and influenced by the travel of the vessel, whereby the position of the latter on the surface of the earth may be determined.

6. A nautical indicating device comprising a member adjustable to set its axis parallel with the earth's axis, a gyroscope comprising a plurality of rotors rotating in planes perpendicular to each other and supported by said member for maintaining the same in such position in the course of travel of the vessel, an electric motor housed within the gyroscope, electrical circuit connections therefor to connect the same with an exterior source of electric energy, gearing driven by the motor for actuating said rotors, and means coöperating with said member and influenced by the travel of the vessel, whereby the position of the latter on the surface of the earth may be determined.

7. A nautical indicating device comprising a member adjustable to set its axis parallel with the earth's axis, a gyroscope comprising a plurality of rotors rotating in planes perpendicular to each other for retaining said member in such position in the course of travel of the vessel, a plurality of coöperating sets of relatively movable members arranged at an angle to each other, gravity means for maintaining one of said members in a perpendicular position, and coöperating indicating devices on the several members controlled by the relative movement thereof to indicate the latitude, longitude and bearing of the vessel at any point in its course, whereby the position of the vessel on the surface of the earth may be determined.

8. A nautical indicating device comprising a frame adjustable to set its axis parallel with the earth's axis and provided with an indicating member, a gyroscope supported by said frame for maintaining the same in such position in the course of travel of the vessel, a plurality of members arranged at an angle to each other and to the frame and relatively adjustable to different angles, said members being provided with indicators to coact with each other and the indicator on the frame, whereby the bearing of the vessel and its position on the earth's surface may be determined, one of said members being gravity-controlled to maintain a determinate position, and means for driving the gyroscope.

9. A nautical indicating device comprising a frame adjustable to set its axis parallel with the earth's axis, a gyroscope supported by and within said frame for maintaining the same in such position during the travel of the vessel, a plurality of coöperating members adjustable to different relative angles to the frame and to each other, gravity means for maintaining one of said members in a perpendicular position coöperating indicating devices on the frame and member affected by the change in the angular relation thereof produced by a relative motion of the parts during the course of travel of the vessel, whereby the position of the latter on the earth's surface may be determined, and driving means for operating the gyroscope from an external source of power.

10. A nautical indicating device comprising a support pivotally mounted in stationary bearings, a frame adjustable to set its axis parallel with the earth's axis, a gyroscope carried by the frame for maintaining the same in such position during the travel of the vessel, means for operating the gyroscope, a plurality of rings pivotally connected with each other and with the frame and support, said rings being arranged at different angles to each other and to the support, gravity means for normally maintaining one of the rings in a perpendicular position, and coacting indicators on the frame and rings operative by the variations in the angular relation thereof produced by a relative motion of the parts during the course of travel of the vessel to indicate the position of the latter on the earth's surface.

11. A nautical indicating device comprising a member adjustable to set its axis parallel with the earth's axis, means carried by said member for maintaining the same in such position in the course of travel of the vessel, a support for said member adjustable at an angle thereto, coöperating indicating devices on the member and support for indicating degrees of longitude through their relative changes in position, coöperating supports for the first named support arranged at different angles thereto and to each other and adjustable to different angular positions, coacting indicating devices carried by said coöperating supports for indicating degrees of latitude and the bearing of the vessel through their relative changes in position, and means operative to effect variations in the angular positions of the parts through the action of gravity in the course of travel of the vessel for influencing the respective indicating devices.

12. A nautical indicating device comprising a main horizontal ring having pivotal supports, an outer vertical ring pivoted to the main horizontal ring, an inner vertical ring pivoted to the outer vertical ring and arranged at an angle thereto, an inner horizontal ring pivoted to said inner vertical ring at an angle to the axis of the horizontal ring, gravity-controlled means for maintaining the outer vertical ring in a perpendicular position, a frame pivotally supported within the inner horizontal ring for adjustment to set its axis parallel with the earth's axis, means carried by said frame for maintaining the same in such position in the course of travel of the vessel, and indicating devices on the frame and rings operative by variations in the relation of said parts in the travel of the vessel to indicate the bearing of the vessel and latitude and longitude of the point of the earth's surface on which the vessel is situated.

In testimony whereof, I affix my signature in presence of two witnesses.

JAY D. STANNARD.

Witnesses:
CHARLES S. WITBECK,
HOWARD S. REED.